(12) United States Patent
Schlesiger et al.

(10) Patent No.: US 8,991,103 B2
(45) Date of Patent: Mar. 31, 2015

(54) METHOD AND DEVICE FOR MONITORING A DRIVE UNIT, ESPECIALLY OF A WINDOW LIFTER, COMPRISING A ROTATING DRIVE MOTOR

(71) Applicant: Brose Fahrzeugteile GmbH & Co. KG, Hallstadt, Hallstadt (DE)

(72) Inventors: Markus Schlesiger, Hallstadt (DE); Roland Kalb, Grossheirath (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 14/193,065

(22) Filed: Feb. 28, 2014

(65) Prior Publication Data

US 2014/0173984 A1    Jun. 26, 2014

Related U.S. Application Data

(63) Continuation of application No. PCT/EP2012/003475, filed on Aug. 16, 2012.

(30) Foreign Application Priority Data

Aug. 30, 2011   (DE) .................. 10 2011 111 450

(51) Int. Cl.
  *E05F 15/00*   (2006.01)
  *E05F 15/20*   (2006.01)
  *H02H 7/085*   (2006.01)

(52) U.S. Cl.
  CPC .......... *E05F 15/0008* (2013.01); *H02H 7/0851* (2013.01); *H02H 7/0858* (2013.01); *E05F 15/0017* (2013.01); *E05F 15/2038* (2013.01); *E05Y 2900/55* (2013.01); *E05Y 2400/58* (2013.01)

USPC .................................................. 49/506; 49/28

(58) Field of Classification Search
  USPC ........ 49/506, 352, 348, 349, 26, 28; 318/299, 318/499

See application file for complete search history.

(56) References Cited

U.S. PATENT DOCUMENTS

| 6,678,601 | B2 * | 1/2004 | Whinnery ................. 701/49 |
| 6,794,837 | B1 * | 9/2004 | Whinnery et al. ........... 318/282 |
| 6,906,487 | B2 * | 6/2005 | de Frutos .................. 318/468 |
| 7,170,244 | B2 * | 1/2007 | Choby ..................... 318/280 |

(Continued)

FOREIGN PATENT DOCUMENTS

| DE | 102 31 450 A1 | 1/2004 |
| DE | 10 2005 000 753 A1 | 8/2005 |

(Continued)

*Primary Examiner* — Katherine Mitchell
*Assistant Examiner* — Justin Rephann
(74) *Attorney, Agent, or Firm* — Muncy, Geissler, Olds & Lowe, P.C.

(57) ABSTRACT

An anti-trap protection unit for an electric window lifter of a vehicle or generally to efficiently limit excess forces of an adjusting element that can be driven by means of a drive unit is provided. For this purpose, a compensation trajectory of the drive unit is determined independent of the temperature, and a variable threshold function which is dependent on the temperature is determined as a function of the drive trajectory or the drive time, the threshold function approaching a defined threshold value asymptotically, and the drive force especially in the form of a measured speed of a drive motor being continuously determined and being monitored in accordance with the determined threshold function.

19 Claims, 3 Drawing Sheets

(56) References Cited

U.S. PATENT DOCUMENTS

| | | | |
|---|---|---|---|
| 7,305,290 B2 | 12/2007 | Russ et al. | |
| 8,022,653 B2 | 9/2011 | Öxle et al. | |
| 8,463,505 B2 * | 6/2013 | Egger et al. | 701/49 |
| 2002/0121872 A1 * | 9/2002 | Boisvert et al. | 318/469 |
| 2004/0261317 A1 * | 12/2004 | Murray | 49/26 |
| 2008/0136358 A1 * | 6/2008 | Newman et al. | 318/286 |
| 2009/0272035 A1 * | 11/2009 | Boisvert et al. | 49/28 |
| 2012/0005963 A1 * | 1/2012 | Zellmer et al. | 49/358 |
| 2012/0285086 A1 * | 11/2012 | Boisvert et al. | 49/25 |
| 2013/0061523 A1 * | 3/2013 | Mankame et al. | 49/26 |

FOREIGN PATENT DOCUMENTS

| | | |
|---|---|---|
| DE | 10 2004 030 499 A1 | 2/2006 |
| DE | 10 2005 016 893 A1 | 4/2006 |
| DE | 10 2006 006 723 A1 | 8/2007 |
| DE | 10 2007 030 656 A1 | 1/2009 |
| DE | 10 2009 054 107 A1 | 5/2011 |
| DE | 10 2010 013 597 B3 | 6/2011 |
| EP | 1 678 803 B1 | 9/2010 |
| WO | WO 2005/041378 A1 | 5/2005 |

* cited by examiner

METHOD AND DEVICE FOR MONITORING A DRIVE UNIT, ESPECIALLY OF A WINDOW LIFTER, COMPRISING A ROTATING DRIVE MOTOR

This nonprovisional application is a continuation of International Application No. PCT/EP2012/003475, which was filed on Aug. 16, 2012, and which claims priority to German Patent Application No. DE 10 2011 111 450.9, which was filed in Germany on Aug. 30, 2011, and which are both herein incorporated by reference.

BACKGROUND OF THE INVENTION

1. Field of the Invention

The present invention relates to the field of mechanical engineering and electrical engineering and can be used advantageously particularly in automotive engineering and is directed especially to a method and a device for monitoring an electric motor drive unit for a drivable adjusting element, particularly a windowpane or a sunroof, in which the force of the drivable element is monitored for the realization of anti-trap protection.

2. Description of the Background Art

In electric window lifters of motor vehicles, for example, such an anti-trap protection is stipulated that assures that during closing of a vehicle window within the scope of automatic closure the counterforce to be overcome by the drive is monitored and limited in such a way that trapped objects can be acted upon only by the maximum allowable force (of typically 100 N) and otherwise the drive is automatically stopped and/or reversed.

Conventional electric window lifters in motor vehicles are designed, for example, as cable window lifters, as shown in DE 10 2010 013 597 B3. A rotating electric motor with a worm gear is shown therein, which drives a cable drum in two drive directions. The cable guided over the cable drum is guided by means of deflection rollers in such a way that it drives a follower, which is guided substantially perpendicular in a guide rail and for its part is connected to a windowpane, in the up and down direction, therefore in the direction of closing and opening.

The drive of the window lifter thus has a motor, a gear, a drivable cable, and a coupling to the drivable element (windowpane or vehicle windowpane). The transmission ratio of the worm gear can be, for example, 1:73 and the force acting on the window (excess force) is in the range of several 100 N. A large part of this force is required for moving the windowpane in the guide in order to overcome frictional and clamping resistances (stiff movements). In the area in which anti-trap protection must be active, namely, during the closing movement at a remaining opening of the window between 4 mm and 200 mm, it must be assured that the applied force of the drive, which can act as a clamping force on the trapped object after removal of the mechanical resistance forces, is less than 100 N. Nevertheless, still lower clamping forces are desirable.

It is common for the realization of anti-trap protection to monitor and limit the forces or torque transmitted overall by the drive motor. To this end, for example, DE 10 2010 013 597 B3 discloses incorporating spring elements in the drive kinematics, whose spring deflection is a measure for the transmitted force or the transmitted torque.

DE 10 231 450 A1 discloses detecting a trapping event by capturing and evaluating the movement path behavior of the window lifter drive. In particular a device for position and speed determination of the electrical drive by means of angle measurements on the drive motor is described therein.

SUMMARY OF THE INVENTION

It is therefore an object of the present invention to provide a method and a device for monitoring a drive unit, particularly a window lifter, by which the most reliable possible adherence to a maximum allowable trapping force, i.e., an anti-trap protection, can be realized. In this respect, the force should be minimized as much as possible, without limiting the functionality of the drive unit in the normal case.

To this end, according to an embodiment of the invention, a traveled drive path of the drive unit is measured continuously. The drive path in this connection can also be understood to be a traversed rotation angle of a shaft of the drive unit, for example, the drive motor shaft.

Thus, provided the traveled drive paths/angles are stored and added or in the case of reversal of the drive direction subtracted from one another, the absolute position of the drive is also available as information.

In addition to the traveled drive path, the drive speed/angular velocity as well can be determined by simultaneous time measurements point by point and as average values, as well as the acceleration or speed change values/rotation speed change values per time interval.

Typically drive path measurements are usually made by observing a point on the kinematic chain of the drive and its locational change. In this regard, the entire drive kinematics because of elasticities and mechanical clearance have overall a spring rate and a mechanical clearance. This has the result that the drive motor must specify a specific finite movement, for example, a rotation angle or a number of rotations, until the total clearance of the drive has been overcome and the elastic elements of the kinematics are tensioned in such a way that when the additionally active static friction parameters are overcome the element to be driven (for example, the vehicle window) does in fact begin to move.

This necessary initial movement of the drive motor is designated as a so-called cable slack in the case of window lifters and can be measured as a compensation path in that the drive motion or the rotary angle of the drive motor is determined, which is necessary at the start of the motion of the drivable element.

The particular compensation path can be reproduced in the case of a drive usually under comparable ambient conditions and can also be determined without its measurement under known ambient conditions, for example, calculated from a formula or read from a characteristic. An essential variable, on which the compensation path is dependent, is the ambient temperature of the drive unit.

In an exemplary embodiment, the invention provides that the compensation path can be determined from the temperature or a temperature-dependent first variable. For example, for this purpose a temperature sensor can be provided in the vicinity of the unit or the temperature can be determined from the power dissipation of semiconductor elements, which, for example, are provided in the control of the drive.

It can also be provided, however, to use the starting behavior of the drive motor, which is highly temperature-dependent, or the resistance of the drive kinematics for determining the temperature or directly for determining the compensation path. The initial acceleration of the drive motor or the maximum rotation speed achieved during the traversing of the compensation path is especially meaningful for this purpose. Characteristics can be determined and stored, from which the corresponding compensation path can be determined directly from the temperature or the achieved maximum rotation speed of the drive.

The typical drive behavior of a drive unit of the aforementioned type, particularly a window lifter, can be described by the rotation speed behavior over the traveled drive path or the drive time, therefore the time difference since the particular start of the drive movement. This is only mentioned briefly here and will be explained in greater detail below in the description of an exemplary embodiment with the use of a drawing.

The rotation speed of the drive motor increases steeply at first after activation of the drive motor. There are only low counterforces in the initial region of the movement, because first the mechanical clearances of the individual elements of the drive kinematics are overcome. The input speed thereby reaches a maximum and then declines again, when the drive kinematics and the movement resistance of the element to be driven build up their elastic counterforce. In this region, for example, the drive cable is tensioned in a cable window lifter. The rotation speed of the drive motor reaches a minimum, when the maximum mechanical tension is reached and the drive motor is stressed maximally.

At this time, during use of a permanently excited DC motor, as it is used, for example, for window lifters in motor vehicles, the minimal rotation speed or a maximum drive current of the drive is reached and the static frictional forces are overcome. The driven element, therefore the vehicle windowpane in the described example, is set in motion. Especially extensive and rapid changes in the drive speed, therefore, for example, the input speed, occur in this region, so that the point at which the compensation path has been traversed can be detected especially sensitively by tracking changes in the rotation speed.

For this purpose, it is virtually possible, over a certain time interval or with periodic capturing over a specific number of capturing periods, particularly four recording periods, to add the rotation speed changes and to determine the sum of the rotation speed changes, which practically represents a change integral over time. As a condition for the actual traversing of the compensation path, in an advantageous embodiment, it can be checked continuously whether the measured change integral, for example, the sum of the last four measured changes in rotation speed reach a predetermined minimum value, therefore a minimum change integral. The minimum change integral can be assumed to be fixed, but can also be determined depending on the temperature or a temperature-dependent second variable, for example, by using a calculation formula or a stored characteristic.

To realize an effective anti-trap protection, a threshold function is also determined as a function of the drive path or the drive time, whose functional values represent in each case a maximum allowable driving power. This threshold function is determined depending on the temperature or a temperature-dependent third variable. The threshold function is formed in such a way that its functional values, starting at a first higher starting threshold (of the driving power), which is assigned to a first point in the starting region of the drive path, over the course of the drive path or the drive time approach a second, lower threshold value (of the driving power).

The first point of the drive path can occur, for example, even before the end of the compensation path or at the end of the compensation path. These points along the path can also be depicted at the appropriate points in time of the drive time. In each case the threshold value of the driving power at the beginning of the movement of the drivable element, therefore at the end of the compensation path, is greater than in the further course of the drive path in the drive direction in which the anti-trap protection is reasonable, therefore in the case of a window lifter the closing direction of the window.

Moreover, the position of the threshold function depends overall on the temperature. This should enable in a comfortable manner the realization of anti-trap protection also at low temperatures at which typically mechanical elements are stiffer than at high temperatures. This is particularly the case due to clamping effects (stiff movements), but also temperature-dependent friction effects. The result is that higher driving powers are necessary at low temperatures in order to actually move a drivable element.

Because for the realization of anti-trap protection, typically the total driving powers are monitored, this would mean that, on the one hand, high driving powers are to be allowed in order to easily enable movement of the drivable element at low temperatures. On the other hand, however, the high allowed driving powers at high ambient temperatures and low movement resistance would lead to unacceptably high trapping forces. For this reason, according to the invention the state of the threshold function is set up as temperature-dependent.

In addition, a course of the threshold function is set up, which allows higher forces at the beginning of the drive movement than over the further course of the drive movement (in the closing or trapping direction). This takes into account the fact that the entire kinematic chain is "run in" during the movement of the drivable element starting from the end of the compensation path, i.e., as soon as the drivable element moves, so that irregularities in the mechanical resistance become increasingly smaller and thereby the allowable clamping force can be minimized or limited further (excess force limitation), without a blockade or reversing solely by frictional resistances and clamping effects without an actual trapping event having to be risked.

The change in the threshold function as well over the course of the drive path or the drive time can be set steeper or less steep as a function of the ambient temperature, but this temperature dependence is typically lower than the temperature dependence of the initial threshold value.

According to an embodiment of the invention, therefore a speed variable of the drive unit, particularly a traversed rotation speed angle per unit time of a rotary drive motor, is determined (measured) continuously. After the compensation path has been traveled at the latest, particularly also under the additional condition that the determined minimum change integral of the speed variable is reached, the driving power or a variable representing it, for example, the rotation speed of the drive or the motor current of the drive motor, is also determined continuously and monitored according to the likewise determined threshold function.

In the case of an electric window lifter, the rotation angle and the rotation speed of the drive motor can be accordingly monitored. After the compensation path has been traveled, it is checked continuously whether the rotation speed of the drive falls below a drive path-dependent or drive time-dependent threshold value. A further decline in the rotation speed means that an unintended counterforce is active, which in the case of a closing movement of a window indicates that an object is trapped. Accordingly, in the case of a closing movement at least in the window closing range to be monitored (for example, an opening width between 4 mm and 200 mm) the anti-trap protection is actively turned on. If the threshold function falls short, the drive motor is turned off, slowed down, or reversed.

Advantageously, the traveled drive path of the drive unit is determined in the form of a rotation angle of the drive shaft of the drive motor or another shaft of a gear of the drive unit or in the form of the traveled path of a push or pull element of the drive unit. In this regard, typically the rotation angle of the drive shaft is measured. However, the rotation angle of another shaft can be measured as well, for example, in a worm gear of a window lifter drive, or the path of an element moved linearly within the drive unit.

It can be provided suitably further that the rotation angle of the drive shaft or another shaft of a gear of the drive unit is measured by means of a magnetic interaction of one, two, or more magnetically active elements, provided on the shaft or a part connected rotationally fixed to it, with one or two stationary magnetic sensor(s), particularly Hall sensor(s) or magnetostrictive sensor(s).

The magnetically active element(s) can be used in the form of ferromagnetic permanent magnets as position encoders whose passing past one or more stationary sensors is recorded. If the sensors at the perimeter of the track of the magnetic elements do not lie asymmetrically opposite to one another, i.e., not at 180 degrees, but are arranged offset, e.g., by 90 degrees, the rotation direction of the drive shaft can also be determined from the evaluation of the pulses and their time sequence. The resolution of the rotation angle measurement and the rotation angle speed can be improved with an increasing number of position encoders.

It can be provided further advantageously that the temperature is measured by means of a temperature sensor, particularly a semiconductor sensor. It can be provided in addition that the drive speed is determined continuously from the measured values of the continuously measured traveled drive path.

When the drive speed is determined continuously, it is advantageous that the measured drive speed is monitored for reaching a speed maximum and the value of the speed maximum is determined. In addition to the achieved speed maximum, the point in time can also be determined and stored at which, after the first activation of the drive motor, the speed maximum or the drive path assigned to it is achieved.

The values of the speed maximum and the time or drive path of the maximum can be used to determine the temperature or also directly to determine the compensation path. To this end, it is advantageously provided that the compensation path is determined from a measured temperature value or the measured speed maximum of the drive unit by means of a mathematical formula or stored characteristic values.

The change in the speed variable of the drive unit, at the time when the drive has traversed the compensation path, is also temperature-dependent. Reaching the end of the compensation path can be reliably gathered from the change integral of the speed variable, particularly the sum of the rotation speed changes within a specific unit time. If this value is monitored, it can be used for confirming the traversing of the compensation path.

An embodiment provides in addition that the threshold function is determined as a function of the drive path or the drive time from a measured temperature value or the measured speed maximum of the drive unit by means of a mathematical formula or stored characteristic values.

In this regard, the entire position of the threshold function is temperature-dependent, whereby the function value of the maximum allowable overall driving power or a variable representing it declines advantageously over the course of the drive path and/or the drive time. It is provided for this purpose that a fixed parameter of the threshold function is determined from a measured temperature value or the determined speed maximum of the drive unit by means of a mathematical formula or a stored characteristic value. In addition, the threshold function of the driving power is formed by adding the fixed parameter and a correction function decreasing, particularly monotonically, from a first, higher function value at a first point in the initial region of the drive path to a second, lower functional value.

If the rotation speed of the drive is monitored as an indicator for the driving power, thus a temperature-dependent rotation speed threshold is established, from which a corresponding drive path-dependent or drive time-dependent monotonically decreasing correction function (toward the value zero) is subtracted. The actual drive path-dependent or drive time-dependent rotation speed threshold (as a difference function) is thus below the rotation speed threshold value which is independent of the drive path and only dependent on temperature, and approaches it over the course of the drive path.

It can be provided especially for this purpose that the correction function approaches the second lower function value, particularly the function value of zero, asymptotically, particularly in the form of a decreasing exponential function. Alternatively to an exponential function, a different asymptotically monotonically decreasing approaching function corresponding to a fixed value, for example, the reciprocal function, can also be selected.

When used for an electric window lifter, it is provided that the threshold function is parametrized in such a way that the maximum allowable trapping force, i.e., the difference between the particular threshold function value and the force required to move the drivable vehicle windowpane, varies continuously over the drive path between 100 N and 60 N. Thereby not only are the legal requirements met, but a comfortably low trapping force is realized.

It is provided in this case that not only monitoring of the driving power is made possible. Rather, the control of the drive is influenced as soon as the driving power over the course of the drive path or the drive time exceeds the value of the threshold function. This occurs particularly in such a way that the drive is stopped, slowed down, or reversed.

When applied to a window lifter of a motor vehicle, it can be provided that the anti-trap protection, i.e., the actual limitation of the driving power and/or the stopping and reversing of the drive, is activated as a function of the actual position of the window and the drive direction of the window. The anti-trap protection can be set up in such a way that its activation occurs only in a closing movement of the window and only at a remaining distance to the top block inlet between 4 mm and 200 mm.

In practice, the maintaining of the threshold function, on the one hand, can be realized directly by monitoring the input speed. On the other hand, it can be monitored whether the actually measured rotation speed falls below a drive path-dependent or drive time-dependent threshold function value. However, the drive current and the exceeding of an applicable current threshold value can be monitored as a function of the drive path or time.

In regard to the device for controlling a drive motor, particularly a window lifter, the aforementioned object of the invention is attained by the features of claim 18. To this end, a control device is provided which is connected to a speed sensor and is provided with a component for determining the temperature from a rotation speed course of the drive motor and/or is connected to a temperature sensor. In response to an operational request, the control device as a function of temperature establishes a threshold function dependent on time and/or on the traversed drive path of the driving power of the drive unit, and when said function is exceeded the drive is turned off or reversed. A rotation speed sensor of the drive unit in particular is provided as the speed sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 5:
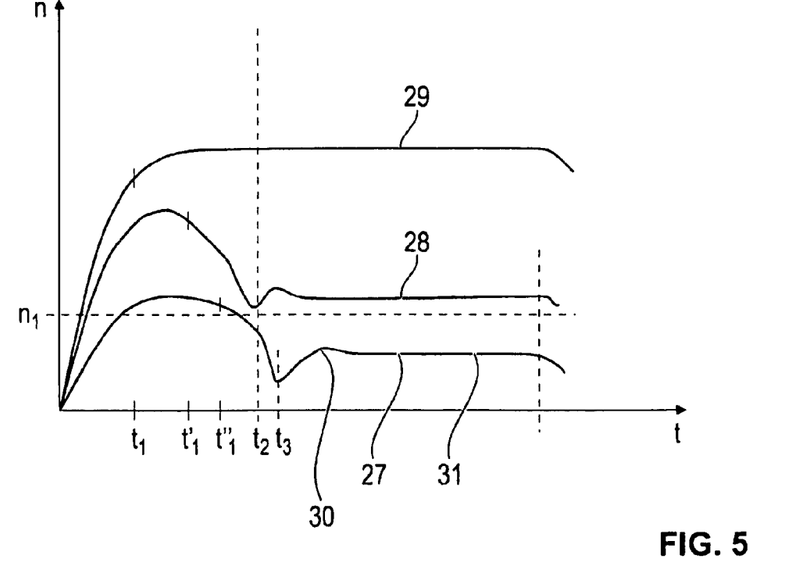
FIG. 5 shows characteristics of the rotation speed behavior during actuation of the window lifter as a function of the time after drive activation and the temperature.
Figure 6:
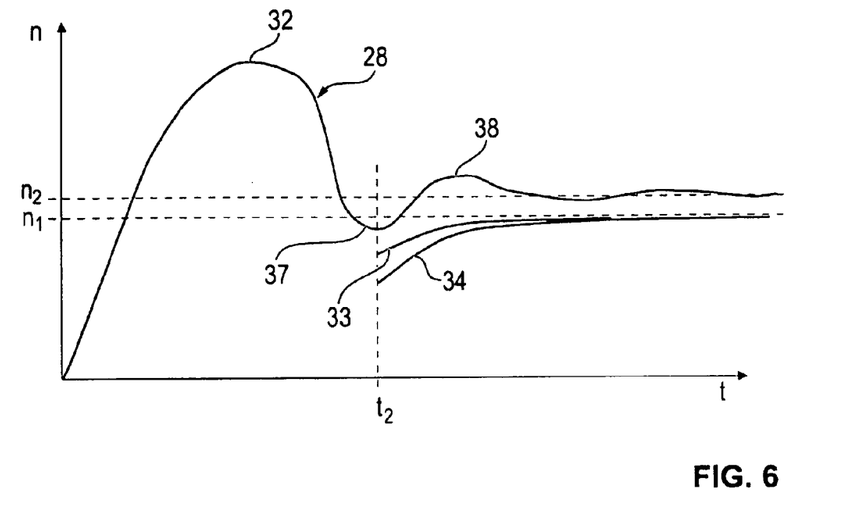
FIG. 6 shows the rotation speed behavior of the drive and possible threshold functions for limiting the trapping force.
Figure 7:
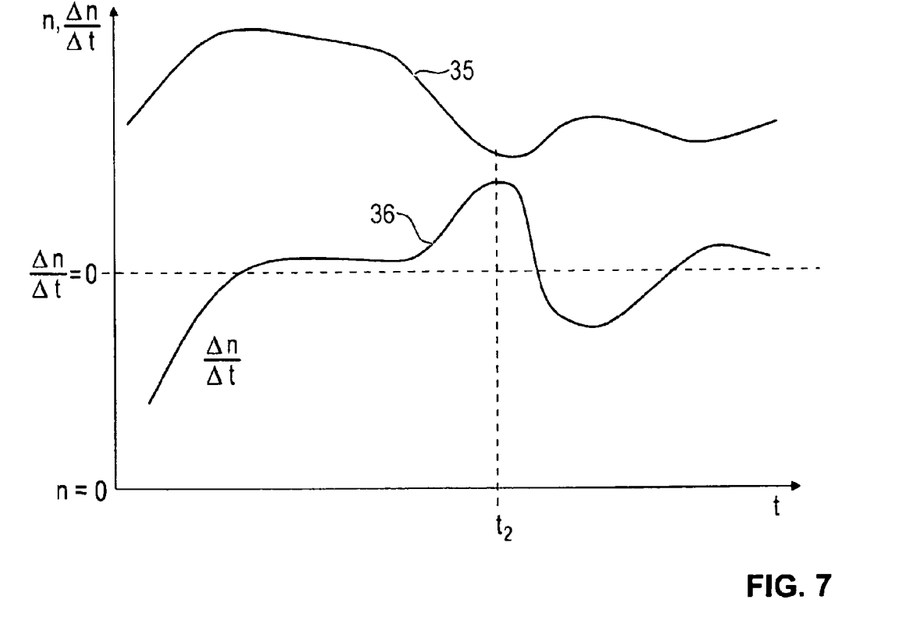
FIG. 7 shows the characteristics related to the rotation speed n and the rotation speed changes plotted versus time after drive activation.

The characteristic plots in FIGS. 5, 6, and 7 should be regarded as qualitative illustrations. In each case, the time t after the first drive motor activation is plotted on the abscissa. This is connected monotonically and over long stretches also linearly with the traversed drive path. If the particular function is plotted versus the drive path rather than the drive time, then qualitatively a similar curve shape is obtained. The statements made in the description can be made either in relation to the time passed t or the correspondingly traversed drive path and correlate qualitatively.

Figure 1:
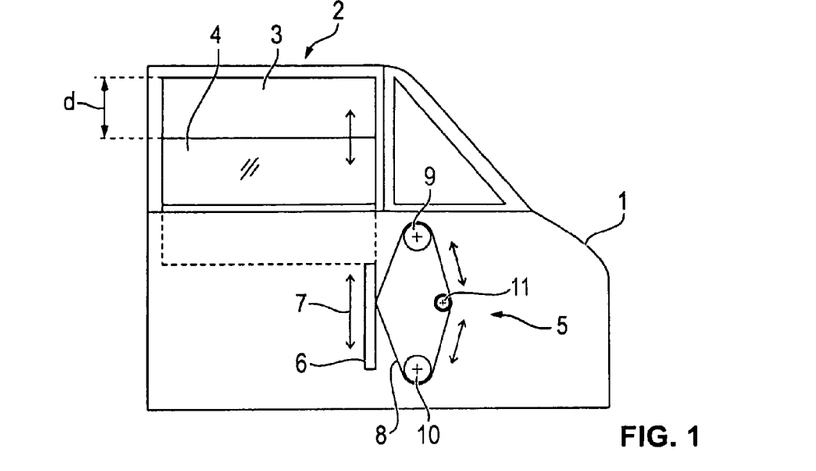
FIG. 1 shows a schematic illustration of a motor vehicle door with a window lifter and a half-open window.

FIG. 1 shows a motor vehicle door 1 with a vehicle window 2, which has a window opening 3 and a windowpane 4. The width d of window opening 3 decreases toward zero during the closing of vehicle window 2, when windowpane 4 enters the top guide of window opening 3 (top block) and then halts.

Moreover, FIG. 1 shows schematically a window lifter 5 with a follower 6, which is connected to windowpane 4 and is guided in a guide not shown in greater detail. Follower 6 can be moved in the two directions represented by the double arrow 7, namely, upward in the closing direction and downward in the opening direction. Follower 6 is connected to a drive cable 8, which is guided between two deflection or guide rollers 9, 10 over a cable drum 11. Cable drum 11 is drivable, so that follower 6 and thereby window 4 can be adjusted by means of cable 8 in the opening and closing direction.

Figure 2:
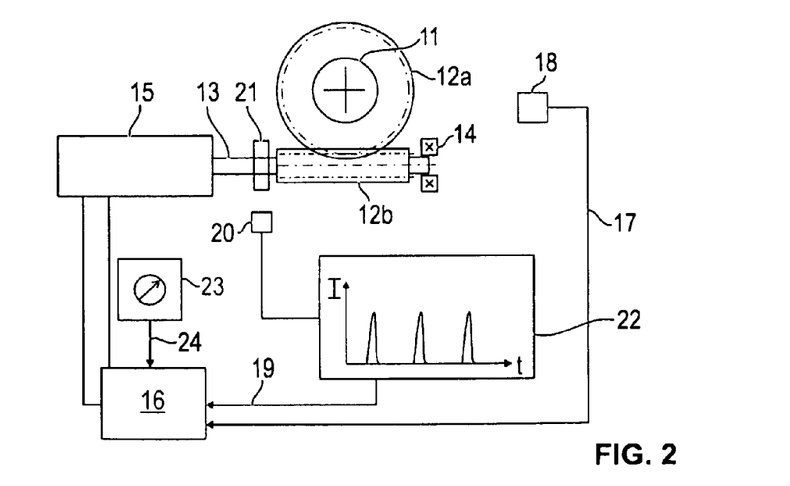
FIG. 2 shows schematically the structure of the window lifter drive.

In FIG. 2, cable drum 11 or a worm wheel 12a connected thereto is shown, which engages with a worm 12b sitting non-rotatably on a drive or motor shaft 13. Motor shaft 13 is supported in a worm-side bearing 14 and in a drive motor 15. Drive motor 15 is an electric DC motor, which is operated from the electrical system of a motor vehicle with an operating voltage between 9 V and 16 V and is designed as a permanently excited electric motor. The shown worm gear 12a, 12b causes a reduction of the motor rotation speed by a factor 1:73. Motor 15 is supplied with current and voltage and controlled by a control device 16. Therefore, window lifter 5 can be operated in the opening and closing direction by the corresponding activation of motor 15.

Drive motor 15 and its motor or drive shaft 13, worm gear 12 with its worm wheel 12a and shaft-mounted worm 12b, and cable drum 11 and drive cable 8 are the major parts of the electric motor drive unit, designated by A, for the vehicle windowpane (adjusting element) 4.

Control device 16 in the shown example is moreover connected by means of a line 17 to a temperature sensor 18, which can be designed as a specialized temperature sensor, for example, as a thermoelectric element. It can be provided, however, that the power dissipation is measured only at electronic components, which are used for other purposes, and the temperature determined therefrom.

In addition, control device 16 is connected via another line 19 to a sensor (position sensor) 20, which captures a drive position. In the shown example, a ring magnet 21, disposed rotationally fixed on motor shaft 13, counts and records the number of rotations of drive shaft 13 by means of stationary sensor 20, which can be designed, for example, as a Hall sensor or as a magnetostrictive sensor. In this case, the rotation direction can be differentiated as well, so that in the case of a number of movements of window lifter 5, made one after the other, an end position can always be provided by summation and difference formation of the traversed angle values. This is determined and stored in a position calculating unit 22. Position sensor 20 can also be a popular optical sensor or a capacitive sensor.

Position calculating unit 22, moreover, has a time base or a connection to an existing time base, so that based on the continuous position determinations a speed of the drive, particularly an angular velocity of the drive or motor shaft 13 in the shown example or in other words a rotation speed can also be determined continuously. This can also be stored periodically, so that rotation speeds and also changes in rotation speeds are available for further calculations.

Optionally a current measuring device 23, which measures the motor or load current I of motor 15 and provides it for analysis, is also disposed between drive motor 15 and control device 16. To this end, current measuring device 23 is also connected to control device 16 by means of a line 24.

Figure 3:
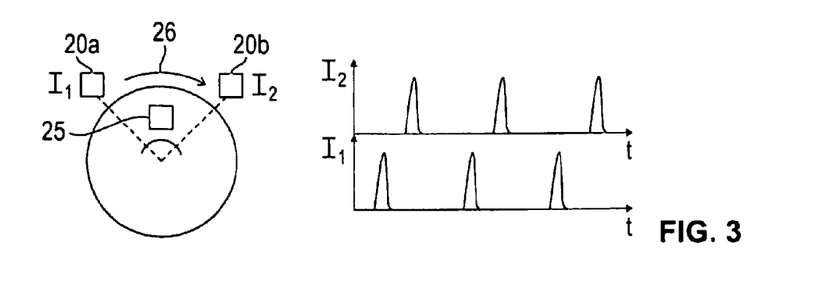
FIG. 3 shows schematically the measuring principle for determining the drive path in the form of a rotation angle of the drive shaft of the drive motor.

It is shown in FIG. 3 how not only the rotation speed of ring magnet 21 but also its rotation direction can be determined by means of two different stationary sensors 20a, 20b relative to rotating ring magnet 21, which has, for example, a magnetically active element 25. First sensor 20a thereby measures an intensity $I_1$ whereas the second sensor 20b measures an intensity $I_2$. If sensors 20a, 20b are designed as sensitive surfaces of a Hall sensor (Hall IC), the shown pulses are already digitized rectangular pulses.

For this purpose, on the right portion of FIG. 3, the intensity measured by sensors 20a, 20b, for example, is plotted as current strength $I_{1,2}$ versus time t, whereby it becomes clear that a pulse in the particular sensor 20a, 20b, which is generated by the passing magnetically active element 25, appears earlier in sensor 20a than in sensor 20b. This permits the conclusion that, for example, 2-pole ring magnet 21 moves clockwise, therefore in the direction of arrow 26.

According to the exemplary embodiment in the present invention, the rotation speed of drive motor 15 or drive shaft 21 is measured and monitored continuously, because the movement speed is virtually constant with limited deviations in the steady state of an approximately uniform movement of vehicle windowpane 4 in a corresponding guide within the vehicle door. It follows therefrom that the input speed is uniform within this region as well. For the realization of anti-trap protection the rotation speed is monitored for falling below a threshold function preferably dependent on the drive path or optionally also on the drive time. Falling short of this threshold indicates the presence of an additionally arising resistance and therefore the presence of trapping.

Figure 4:
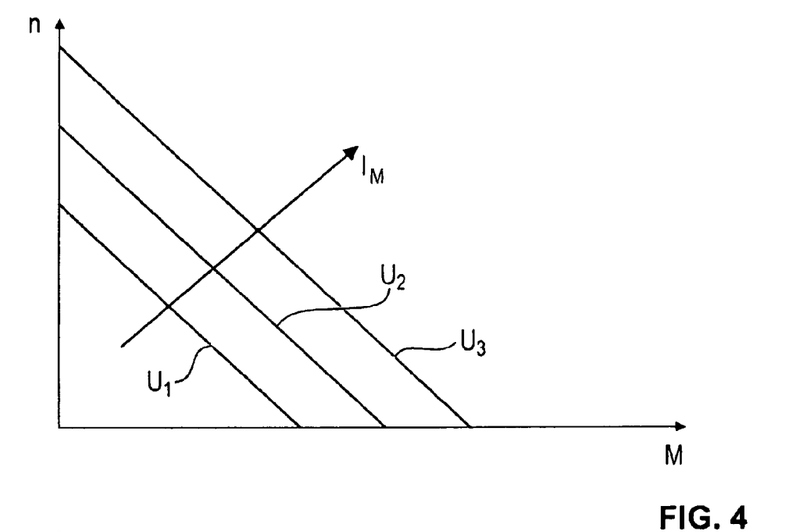
FIG. 4 shows characteristics on the behavior of the drive rotation speed n versus the drive torque M.

FIG. 4, using a characteristic field for constant supply voltages U1, U2, U3 and for a fixed temperature, shows how the rotation speed n of drive motor 15 is related to a torque M of drive motor 15, which can be converted directly to a force acting on the window lifter. With the selection of a higher supply voltage $U_n$ and accordingly under otherwise identical ambient conditions the rotation speed n and therefore motor current $I_M$ of drive motor 15 increase, as is shown in FIG. 4.

Instead of monitoring the rotation speed n for falling below an established threshold function, motor current $I_M$ of drive motor 15 can therefore also be monitored for exceeding a corresponding threshold function of the current.

The invention deals especially with a realistic but optimized determination of a threshold function, which permits a sensible shutting down in the case of trapping, thereby enables the consideration of the ambient temperature and in addition enables a large acceptance range of driving power changes within the region of overcoming the cable slack up to the movement of vehicle windowpane 4 and in the initial region of the windowpane movement.

To explain the method of the invention, the rotation speed course of a drive motor 15 of a window lifter 5 in different temperature situations during the traversal of a drive path over time t is described first with FIG. 5. The very bottom curve 27 in FIG. 5 shows a rotation speed course at a temperature of, for example, −30° C., the middle curve 28 shows the course at +20° C., and curve 29 at the very top the course at +80° C.

Curve 27 shows at t=0 a rotation speed n=0 at the time at which an operational request to window lifter 5 occurs and drive motor 15 is activated for the first time. The rotation speed n increases, whereby first the rotor and thereby motor shaft 13 of drive motor 15 is accelerated and all mechanical clearances in the kinematic chain of window lifter 5 are overcome.

The rotation speed n reaches a maximum at time $t_1$ to then decline again as the mechanical resistances in the kinematic chain increase. These are frictional resistances and, for example, elastic resistances, i.e., elastic deformations, expansions, or compressions of individual parts of the kinematic chain. These parts, acting in a way as spring elements, in the kinematic chain are for a stretch deformed or tensioned in the sense of a spring and the mechanical resistance increases, so that the rotation speed due to the increase in load declines further.

At time $t_3$ according to curve 27 a minimum of the rotation speed n is reached whereupon the rotation speed n increases again, after static frictional resistances of vehicle windowpane 4 to be driven are overcome. In this phase, partial elastic deformations (loads) of the kinematic chain are additionally relaxed, so that an overshoot 30 of the rotation speed n results, until it enters a constant region 31, which corresponds to the uniform movement of vehicle windowpane 4 until it enters the top block, i.e., the top door seal, at time $t_4$ with a corresponding slowing of drive motor 15.

In comparison with curve 27, in the case of curve 28 corresponding to a higher ambient temperature a higher rotation speed n is reached at the rotation speed maximum at time $t'_1$, because the clamping forces and frictional forces typically arising earlier and more greatly at low temperatures in the kinematic chain are lower at a higher ambient temperature, for example, at 20° C. The static friction of windowpane 4 to be moved can also be lower at higher temperatures, so that the reduction of rotation speed n until the cable slack is overcome and vehicle windowpane 4 begins to move is less extreme than according to curve 27. Accordingly, the cable slack at higher temperatures is usually overcome already at a relatively earlier time $t_2$ and the actual movement of windowpane 4 begins earlier.

The third curve 29 runs comparatively steeply from the origin of the coordinate system to a rotation speed maximum at about $t''_1$, which corresponds to a relatively high rotation speed n, which can be attributed to low friction. Here the clamping forces are virtually negligible, so that windowpane 4, virtually without a drop in rotation speed n, is carried along without a delay. The rotation speed curve therefore runs virtually monotonically into a horizontal line.

The particular threshold curves for monitoring the rotation speed n for a trapping case are below curves 27, 28, 29, whereby the monitoring of the force/rotation speed makes sense only with the actual movement of windowpane 4. For example, a rotation speed $n_1$ as a constant threshold function is shown as a dashed line, by means of which at a temperature of 20° C. the rotation speed course, which without a trapping event usually follows curve 28, can be monitored. Because it must assured that in the starting area in time immediately after time $t_2$, when overshoots of the rotation speed n are still expected, these do not fall below the threshold function, a certain distance of threshold $n_1$ to curve 28 must be maintained. At a constant threshold function during the later course, i.e., toward the end of the closing movement, this nevertheless causes an acceptance of high trapping forces with the result that in the trapping case shutting down occurs only at a relatively high trapping force.

Basically the invention is therefore based on the idea that no constant threshold function is used but that in contrast to the course of the constant threshold function $n_1$, the threshold function selected instead approaches the actual curve 28 at a later phase of the closing process.

The method of the invention addresses how, on the one hand, the position of the threshold value curve can be determined overall and how an asymptotic course can be appropriately selected between an initially lower threshold value of the rotation speed n and a higher threshold value toward the end of the movement.

FIG. 6 shows the rotation speed course of curve 28 already shown in FIG. 5 with a pronounced rotation speed maximum 32, a minimum 37 following thereupon at time $t_2$, an overshoot 38, and a stabilization of the rotation speed n at a value $n_2$. The rotation speed $n_1$, which is smaller than $n_2$, is provided asymptotically as the lower threshold of the rotation speed. The rotation speed (rotation threshold value) $n_1$, like the rotation speed or the rotation threshold value $n_2$, is indicated as a horizontal dashed line in FIG. 6. A decline in the actual rotation speed n below the threshold $n_1$ is to be prevented in the region in which the anti-trap protection is activated.

The threshold value $n_1$ to establish the threshold function is determined individually from the measured temperature by means of calculation or assignment from a characteristic. The value $n_1$, however, can be assigned from the maximum rotation speed achieved at the maximum 32 by means of a characteristic or alternatively first the temperature can be determined likewise by a characteristic from the maximum rotation speed, whereupon the rotation speed threshold $n_1$ can be determined from the thus determined temperature.

In order to determine the actual threshold function 33, 34, an exponential function $a \cdot e^{-bt}$ or purely path-dependent $a \cdot e^{-bx}$ subtracted from the determined constant value $n_1$, whereby t is the drive time and x the traveled drive path, whereby x can also be measured in an angle unit of the traversed drive angle of drive shaft 13. In this regard, both parameter a and parameter b can be temperature-dependent and be assigned from a characteristic of the previously determined temperature.

Two possible threshold functions 33, 34 are shown in FIG. 6; both of these are selected in such a way that the system-related irregularities, which occur at the rotation speed n immediately after time $t_2$, do not lead to a response of the anti-trap protection. In the shown threshold functions 33, 34, a greater deviation of the excess force is still allowed at the beginning of the movement of windowpane 4 than in the further course of the movement. In other words, the anti-trap protection unit adapts or runs through a learning function.

In FIG. 7, in addition to a rotation speed curve 35, another curve 36 is shown, which in its nature represents the rotation speed changes of drive motor 15 per unit time, whereby according to the invention the rotation speed changes dn/dt (t) can be advantageously added together over four immediately previous time cycles. It is evident that at time $t_2$, which corresponds to the actual start of movement of a windowpane 4 to be driven, curve 36 (dn/dt) has an especially pronounced maximum, which is more sharply pronounced than the minimum of the rotation speed curve n(t). It therefore follows that the time $t_2$ of the start of movement of windowpane 4 can also be determined and possibly more simply from a curve, in which the summed up or integrated rotation speed changes dn/dt are shown. Said curve 36 represents the course of the change integral of the speed variable, namely, the angular velocity, over four immediately previous time units.

The time $t_2$ determined in the described manner can be used to trigger the anti-trap protection or to determine the threshold function 33, 34 and the starting point. A combined function can also be used, based on a summation of the rotation speed curve n(t) and the change integral curve or from a difference of these two curves, in order to be able to detect the start of movement of the vehicle windowpane or the end of the traversal of the compensation path based on such a combined function, formed especially strikingly in the region of time $t_2$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for monitoring an electric motor drive unit for a drivable adjusting element, to maintain a maximum allowable trapping force of the adjusting element, the method comprising:
   measuring a traveled drive path or a drive time of the drive unit continuously;
   determining a compensation path of the drive unit based on a temperature or a temperature-dependent first variable;
   determining a minimum change integral of a speed variable of the drive unit based on the temperature or a temperature-dependent second variable;
   determining, based on the temperature or a temperature-dependent third variable, a threshold function as a function of the drive path or the drive time, whose function values in each case represent a maximum allowable driving power starting at a first higher threshold value, which is assigned to a first point in a starting area of the drive path or the drive time, over a course of the drive path or the drive time, the function values approach a second lower threshold value;
   determining a speed variable of the drive unit continuously and a change integral thereof; and
   determining continuously, after the determined compensation path is traveled and after the determined minimum change integral of the speed variable is reached, the driving power or a variable representing the driving power and monitoring the driving power or the variable representing the driving power according to the determined threshold function.

2. The method according to claim 1, wherein the traveled drive path of the drive unit is determined in the form of a rotation angle of a drive shaft or another shaft of a gear of the drive unit or in the form of a traveled path of a push or pull element of the drive unit.

3. The method according to claim 1, wherein a rotation angle of the drive shaft or another shaft of a gear of the drive unit is measured via a magnetic interaction of one or more magnetically active elements provided on the particular shaft or a part connected rotationally fixed to it, with one or two stationary magnetic sensors, Hall sensors or magnetostrictive sensors.

4. The method according to claim 1, wherein the temperature is measured via a temperature sensor or a semiconductor sensor.

5. The method according to claim 1, wherein the drive speed is determined continuously from the measured values of the continuously measured traveled drive path.

6. The method according to claim 5, wherein the determined drive speed is monitored for reaching a speed maximum and a value of the speed maximum is determined.

7. The method according to claim 1, wherein the compensation path is determined from a measured value of the temperature or the determined speed maximum of the drive unit via a mathematical formula or stored characteristic values.

8. The method according to claim 1, wherein the minimum change integral of the speed variable of the drive unit is determined from a measured value of the temperature or the determined speed maximum of the drive unit via a mathematical formula or stored characteristic values.

9. The method according to claim 1, wherein the threshold function for the driving power, or the rotation speed, is determined as a function of the drive path from a measured temperature value or a measured speed maximum of the drive unit via a mathematical formula or stored characteristic values.

10. The method according to claim 1, wherein a fixed parameter of the threshold function for the driving power, or the rotation speed threshold function, is determined from a measured value of the temperature or a determined speed maximum of the drive unit via a mathematical formula or stored characteristic values, and wherein
   the threshold function is formed by addition or subtraction of the fixed parameter and a correction function decreasing from a first higher function value at a first point in the starting area of the drive path to a second lower function value.

11. The method according to claim 10, wherein the correction function approaches the second lower function value in the form of a decreasing exponential function.

12. The method according to claim 1, wherein the threshold function is parameterized in such a way that the maximum allowable trapping force from the difference between a threshold function value of the driving power and the power required to move the drivable element over the drive path after traversing the compensation path varies continuously between 100 N and 60 N.

13. The method according to claim 1, wherein the speed variable is the drive speed and speed changes of the drive speed are determined periodically or continuously.

14. The method according to claim 13, wherein determined speed changes are added or integrated for determining a change integral over a specific period of time and the value of the change integral is monitored.

15. The method according to claim 1, wherein an activation of the drive unit is influenced, so that the drive unit is stopped, slowed down, or reversed, when the driving power over the course of the drive path exceeds a value of the threshold function.

16. The method according to claim 1, wherein the driving power is determined from the measured drive speed, the rotation speed of the drive motor, or a measured electric power taken up by the drive motor, or from the measured motor current.

17. The method according to claim 1, wherein the rotation speed of the drive motor is monitored directly as the speed variable representing the driving power.

18. The method according to claim 1, further comprising:

providing a control device for activating the electric motor drive unit of the adjusting element of a motor vehicle, which is connected to a speed sensor or a rotation speed sensor of the drive unit and is provided with a component for determining the temperature from the rotation speed course and/or is connected to a temperature sensor, and which upon an operational request depending on the temperature establishes the threshold function, changeable in time and/or depending on the drive path, of the driving power of the drive unit, wherein, when said function is exceeded, the drive is turned off or reversed.

19. The method according to claim 1, wherein the drivable adjusting element is a window lifter.

* * * * *